Feb. 10, 1953     B. R. ZITNER     2,627,787
MACHINE TOOL TABLE WORK CLAMP
Filed March 14, 1951
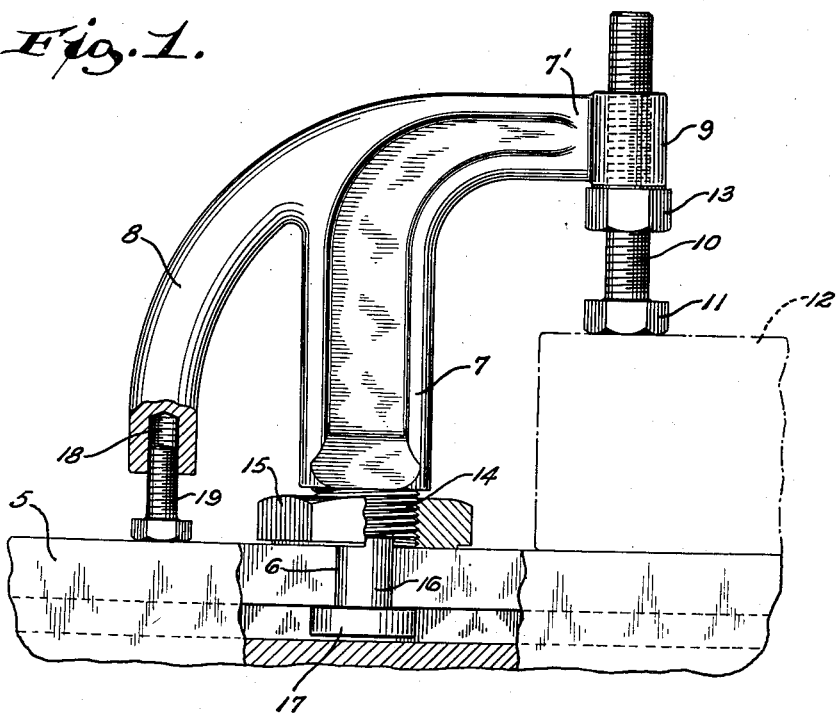
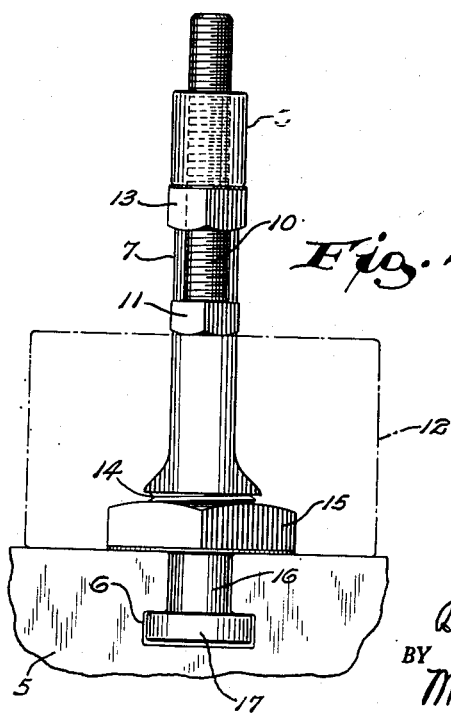
INVENTOR.
Berthold R. Zitner,
BY Morsell & Morsell
ATTORNEYS Patented Feb. 10, 1953

2,627,787

UNITED STATES PATENT OFFICE 2,627,787

MACHINE-TOOL TABLE WORK CLAMP

Berthold R. Zitner, Milwaukee, Wis.

Application March 14, 1951, Serial No. 215,550

3 Claims. (Cl. 90—59)

This invention relates to improvements in machine tool table work clamps.

Machine tools, such as drill tables, planers or milling machines, ordinarily have tables or bed plates provided with inverted T-slots. In the conventional operation of such machine tools make-shift means are resorted to for the purpose of clamping the work to the top face of the table or bed plate of the machine. Such make-shift means commonly comprise long shanked bolts mounted with their heads in the T-slot of the table with their shanks extended through metal plates with the latter being clamped down onto the work.

With the above in mind the primary object of the present invention is to provide as a unitary device a clamp for easily adjustably securing work to the table of a machine tool.

A further object of the invention is to provide a machine tool table work clamp having a portion adapted to be received in the T-slot of a machine tool table or bed plate with an integral portion for engaging the work to clamp it to the table, and further having an integral portion to act as a stabilizing brace and which is adjustably engageable with the surface of the table.

A further object of the invention is to provide a machine tool table work clamp in which the various portions thereof which engage the table and the work are all adjustable.

A further object of the invention is to provide a machine tool table work clamp which is compact and does not interfere with the work or with the machine tool, which is unitary, which is easily engaged with a machine tool table and with the work to be clamped, which is strong and durable and easy to manipulate, and which is well adapted for the purposes described.

With the above and other objects in view the invention consists of the improved machine tool table work clamp and its parts and combinations as set forth in the claims, and all equivalents thereof.

In the accompanying drawing in which the same reference characters indicate the same parts in both of the views:

Fig. 1 is a fragmentary side view of the table or bed plate portion of a machine tool showing the improved clamp mounted thereon for the purpose of securing to the bed plate a piece of work, there being a broken line showing of the latter, portions of the table and clamp being broken away and in section; and Fig. 2 is a front view of the showing in Fig. 1.

Referring now more particularly to the drawing, it will appear that the table or bed plate of a machine tool is indicated by the numeral 5. As is conventional, said table or bed plate is provided with an inverted T-slot 6 which extends from one end of the table to the other.

The improved work clamp is of unitary or integral construction and is preferably formed of a suitable metal and includes a central post 7 adapted in use to assume an upright position and having extended rearwardly and downwardly from its upper end an integral arm or brace 8 having its major extent curved on a radius. Extending forwardly from the upper portion of the central post portion 7 is a horizontal extension 7' terminating in a bore internally threaded sleeve 9 whose axis is normally vertically disposed.

The threaded sleeve 9 adjustably receives the threaded shank portion of an elongated clamping bolt 10. The lower end of the shank of the clamping bolt has an integral enlarged head 11 which, in use, is adapted to clampingly engage the top surface of a piece of work 12 positioned on the top surface of the table 5 and to be operated on by the machine tool (not shown). Threaded onto the shank of the clamping bolt 10 below the lower end of the sleeve 9 is a clamping nut 13 which, when the bolt is adjusted so as to firmly impinge against the top surface of the work 12, may be drawn up tightly to thereby hold the clamping bolt in its set position.

The lower depending end of the central post 7 is formed with an externally threaded cylindrical portion 14 which adjustably receives a large nut 15. Below said threaded cylindrical portion 14 there is an integral cylindrical stem 16 of a reduced diameter and of a size to be accommodated by the reduced portion of the T-slot 6 in the table or bed plate of the machine and the lower end of the reduced stem 16 carries an integral disc-like head 17 to engage in the enlarged portion of the T-slot 6.

The arm or brace 8 terminates slightly above the upper end of the threaded cylindrical portion 14 of the central post 7 and is formed with an internally threaded bore 18 which adjustably receives the threaded shank of an extension bolt 19, the latter being arranged so that its head may be adjusted to impinge against the top surface of the table or bed plate to thus steady the entire clamp and prevent any possibility of the same tilting.

The operative arrangement of the improved clamp is clearly shown in the drawing. When the clamp is to be used for holding a piece of work 12 on to the bed plate, the members 10, 19 and 15 are initially drawn upwardly and the stem portion 16 and its head 17 of the central post is engaged in one open end of the T-slot 6 of the table or bed plate whereupon the clamp may be slid along the slot to position it conveniently adjacent the work 12. Thereupon the large nut 15 is drawn downwardly against the surface of the table and the clamping bolt 10 is adjusted so as to clampingly engage the top of the work 12 to be operated on with the clamping nut 13 then being drawn up to prevent undesired movement of the clamping bolt 10. In order to steady and support the entire clamp against any possibility of tilting or rocking, the belt 19 at the lower end of the arm or brace 8, which constitutes an adjustable foot, may be turned so as to tightly impinge against the upper surface of the table 5. Thereupon, the machine tool may be operated in its usual manner with respect to the clamped work 12 and the same will be held onto the bed plate very securely and without danger of dislodgement.

The machine tool table work clamp is of unitary or integral construction and carries the various adjustable elements and the entire clamp may be easily mounted on the machine tool table or bed plate. When mounted on a bed plate the clamp is easily secured in its proper position and the work is also effectively engaged. In addition, the rearwardly extending curved arm, having the adjustable foot, permits effective bracing of the clamp so it will not be rocked loose or tilted into an improper position during the operation of the machine tool. The clamp is furthermore of simple construction, is easy to mount and adjust, and is well adapted for the purposes set forth.

What is claimed as the invention is:

1. A machine tool table work clamp, comprising a central upright post having at its lower extremity an integral headed stem of circular form in cross section to slidably and rotatably engage the inverted T-slot in a machine table, the head of said stem being of circular contour at the lower end thereof, a nut adjustably mounted on said post spacedly above the head of said stem to engage the top surface of a machine table, an integral lateral extension at the upper end of said central post, a work clamping member adjustably depended from the outer end of said lateral extension, and a bracing arm integral with said post and extending outwardly and downwardly from the upper end of said post and directly engageable with the top surface of a machine table.

2. A machine tool table work clamp, comprising a central upright post having at its lower extremity an integral headed stem of circular form in cross section to slidably and freely rotatably engage the inverted T-slot in a machine table, the head of said stem being at the lower end thereof and being of circular contour, a nut adjustably mounted on said post spacedly above the head of said stem to engage the top surface of a machine table, an integral lateral extension at the upper end of said central post, a work clamping member adjustably depended from the outer end of said lateral extension, a bracing arm integral with said post and extending outwardly opposite to the direction of extent of said extension and downwardly from the upper end of said post, and an adjustable table surface engaging foot depended from the lower end of said arm and terminating substantially above the head of said stem.

3. A machine tool table work clamp of unitary construction, comprising a central, upright, massive post having at its lower extremity an integral headed stem of circular cross section to slidably and freely rotatably engage the inverted T-slot in a machine table, the head of said stem being of circular contour and being at the lower end thereof, a relatively large nut adjustably mounted on said post spacedly above the head of said stem to engage the top surface of a machine table, an integral lateral extension at the upper end of said central post terminating in an internally threaded sleeve, a work clamping bolt having its shank threaded into said sleeve, a bracing arm integral with said post and extending outwardly and downwardly from the upper end of said post, and a bolt adjustably threaded into the lower end of said arm, the head on said stem, and the lower ends of said bolts all being at different elevations.

BERTHOLD R. ZITNER.

REFERENCES CITED

The following references are of record in the file of this patent:

UNITED STATES PATENTS

| Number | Name | Date |
| --- | --- | --- |
| 2,061,718 | Stahl | Nov. 24, 1936 |
| 2,487,022 | La Placa | Nov. 1, 1949 |

FOREIGN PATENTS

| Number | Country | Date |
| --- | --- | --- |
| 571,234 | France | Jan. 30, 1924 |
| 584,243 | Great Britain | Jan. 9, 1947 |